(12) United States Patent
Tompkins

(10) Patent No.: US 10,975,554 B2
(45) Date of Patent: Apr. 13, 2021

(54) METHOD FOR RELEASABLY SECURING A SINK STRAINER

(71) Applicant: Philip Tompkins, Choctaw, OK (US)

(72) Inventor: Philip Tompkins, Choctaw, OK (US)

(*) Notice: Subject to any disclaimer, the term of this patent is extended or adjusted under 35 U.S.C. 154(b) by 0 days.

(21) Appl. No.: 16/183,467

(22) Filed: Nov. 7, 2018

(65) Prior Publication Data

US 2020/0141101 A1 May 7, 2020

(51) Int. Cl.
| | |
|---|---|
| *E03C 1/26* | (2006.01) |
| *F16B 37/00* | (2006.01) |
| *B21D 53/24* | (2006.01) |
| *E03C 1/282* | (2006.01) |
| *F16B 39/24* | (2006.01) |
| *E03C 1/28* | (2006.01) |
| *F16B 43/00* | (2006.01) |
| *F16B 21/18* | (2006.01) |
| *F16B 39/14* | (2006.01) |
| *B21D 53/36* | (2006.01) |

(52) U.S. Cl.
CPC ............... *E03C 1/26* (2013.01); *B21D 53/24* (2013.01); *F16B 37/00* (2013.01); *B21D 53/36* (2013.01); *E03C 1/28* (2013.01); *E03C 1/282* (2013.01); *F16B 21/18* (2013.01); *F16B 39/14* (2013.01); *F16B 39/24* (2013.01); *F16B 43/00* (2013.01)

(58) Field of Classification Search
CPC ... E03C 1/26; E03C 1/28; E03C 1/282; F16B 39/24; F16B 39/14; F16B 37/00; F16B 21/18; F16B 43/00; B21D 53/24; B21D 53/36

USPC .................. 411/427, 432, 437, 517
See application file for complete search history.

(56) References Cited

U.S. PATENT DOCUMENTS

| | | | | |
|---|---|---|---|---|
| 3,509,587 A * | 5/1970 | Fins | ............... | E03C 1/22 4/288 |
| 6,131,859 A * | 10/2000 | Giuliano | ............... | F16L 3/1016 24/279 |
| 2011/0145989 A1* | 6/2011 | Jan | ............... | E03C 1/282 4/679 |

* cited by examiner

*Primary Examiner* — Jermie E Cozart
(74) *Attorney, Agent, or Firm* — Dunlap Codding, P.C.

(57) ABSTRACT

A method for releasably securing a sink strainer in a drain hole of a sink by providing a lock nut having a split defined by a pair of opposed surfaces and a locking system comprising a pair of opposed tabs attached to the outer surface of the lock nut with one tab on one side of the split having a threaded hole spaced perpendicularly with respect to the opposed surfaces for receiving a threaded fastener and a second tab attached to the outer surface of the lock nut on the opposite side of the split in opposed spaced relationship to the first tab. The second tab having a hole in axisymmetric spaced relationship to the threaded hole with a diameter of sufficient size to allow a threaded fastener to pass therethrough, and a threaded fastener positioned within the axisymmetric spaced hole and arranged to pass through the hole in the second tab and securely engage the threaded hole in the first tab. When engaged, the threaded fastener holds the opposed surfaces in mating relationship during normal use, and when removed, provide for the lock nut to release from its position in response to application of an external force.

4 Claims, 3 Drawing Sheets

METHOD FOR RELEASABLY SECURING A SINK STRAINER

BACKGROUND

Sink strainer lock nuts are utilized to attach a sink strainer to the underside of sink, such as, for example, a kitchen sink or any other similar type of sink. Typical sink strainers, also called basket strainers, include a lower end extending through a hole in the sink bottom and having threads thereon for engaging with a lock nut below the drain hole. Upon tightening the lock nut, the strainer is held in a watertight position in the drain hole.

Sink strainer lock nuts typically have an upper edge, which over time can become bonded to the underside surface of the sink and thus be difficult to remove. One removal method requires a hammer to drive a cold chisel or screwdriver against lugs on the lock nut to break the lock nut loose. This can be time consuming and expensive and result in damage to the sink and plumbing. Another method for removing the lock nut is to use a spanner-type wrench to engage the lugs. This method can be difficult and time consuming because of the tight space in which to work and a tendency of the wrench to slip due to poor contact with only a few lugs on the lock nut.

It is desirable, therefore, to provide an improved sink strainer lock nut design and method for releasably securing a sink strainer in a drain hole of a sink.

SUMMARY OF THE INVENTIVE CONCEPTS

The described and claimed inventive concept(s) provide a method for releasably securing a sink strainer in a drain hole of a sink by providing a split lock nut of the type having a threaded internal surface for engaging a threaded outer surface of the strainer below the drain hole. Upon tightening of the split lock nut, the strainer is held in a watertight position in the drain hole, while over time the lock nut bonds to the underside surface of the sink. The lock nut has a conventional nut shape defined by
(i) an upper edge for seating against the underside surface of the sink when the lock nut is threaded onto the outer surface of the sink strainer;
(ii) an outer surface having a plurality of integral gripping nodules or lugs spaced about the periphery thereof;
(iii) a split corresponding generally to the rotational centerline of the lock nut being defined by a pair of opposed surfaces; and
(iv) a locking system for locking the opposed surfaces in mating relationship during normal use.

The locking system comprises a pair of opposed tabs, the first tab being attached to the outer surface of the lock nut on one side of the split and having a threaded hole spaced perpendicularly regarding the opposed surfaces for receiving a threaded fastener. The second tab is attached to the outer surface of the lock nut on the opposite side of the split in opposed spaced relationship to the first tab, the second tab having a hole in axisymmetric spaced relationship to the threaded hole with a diameter of sufficient size to allow the threaded fastener to pass therethrough. A threaded fastener, for example, a round head machine screw, is positioned within the axisymmetric spaced hole and passed through the hole in the second tab and securely engage the threaded hole in the first tab. When tightened, the threaded fastener holds the opposed surfaces in mating relationship during normal use, and removed, provides for the lock nut to release from its bonded position in response to application of an external prying force.

In one embodiment, the lock nut has an upper edge terminating in a flange for seating against the underside surface of the sink. According to another embodiment, the pair of opposed tabs are integrally molded with the lock nut from an engineering thermoplastic polymer selected from, for example, acrylonitrile butadiene styrene (ABS), nylon 6, nylon 6-6, polyamides (PA), polybutylene terephthalate (PBT), and polycarbonates (PC).

BRIEF DESCRIPTION OF THE DRAWINGS

Like reference numerals in the figures represent and refer to the same or similar element or function. Implementations of the inventive concepts disclosed may be better understood when consideration is given to this detailed description thereof. Such description references to the annexed pictorial illustrations, schematics, graphs, drawings, and appendices. In the drawings.

DETAILED DESCRIPTION OF EXEMPLARY EMBODIMENTS

Figure 1:
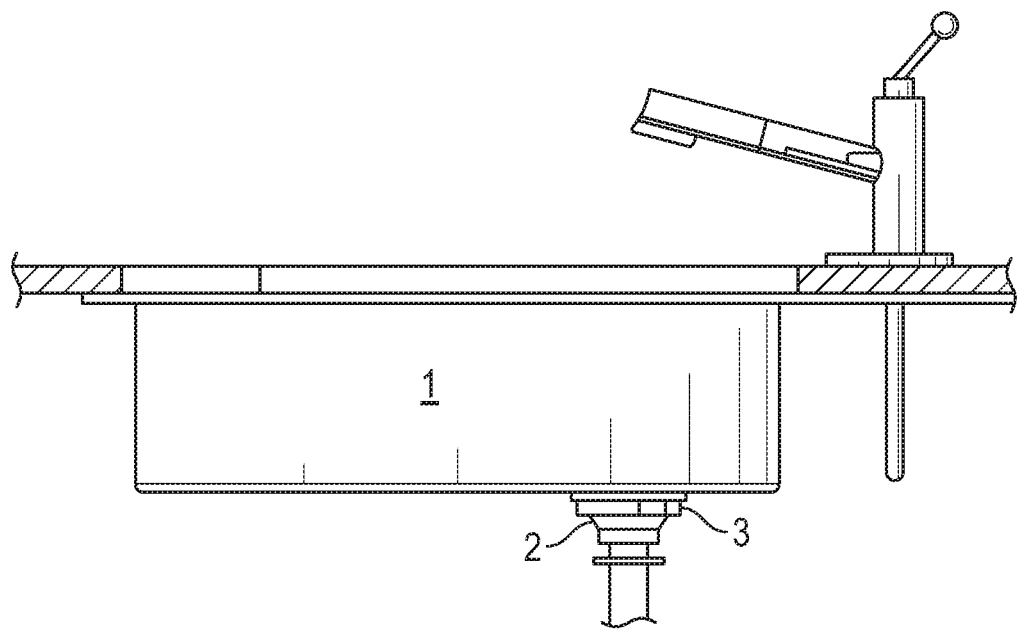
FIG. 1 is a side elevational view of a typical sink showing a prior art sink strainer and lock nut.

Before explaining at least one embodiment of the inventive concepts disclosed, it is to be understood that the inventive concepts are not limited in their application to the details of construction and the arrangement of the components or steps or methodologies in the following description or illustrated in the drawings. The inventive concepts disclosed are capable of other embodiments, such as dual gradient drilling, or of being practiced or carried out in various ways. Also, it is to be understood that the phraseology and terminology employed is for description only and should not be regarded as limiting the inventive concepts disclosed and claimed herein.

In this detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features may not be described to avoid unnecessarily complicating the disclosure.

Further, unless stated to the contrary, "or" refers to an inclusive "or" and not to an exclusive "or." For example, a condition A or B is satisfied by anyone of: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts disclosed. This description should be read to include one or at least one and the singular also includes the plural unless it is obvious that it is meant otherwise.

As used herein any reference to "one embodiment" or "an embodiment" means that a particular element, feature, structure, or characteristic described in the embodiment is included in at least one embodiment. The appearances of the phrase "in one embodiment" in various places in the specification are not necessarily all referring to the same embodiment.

Figure 2:
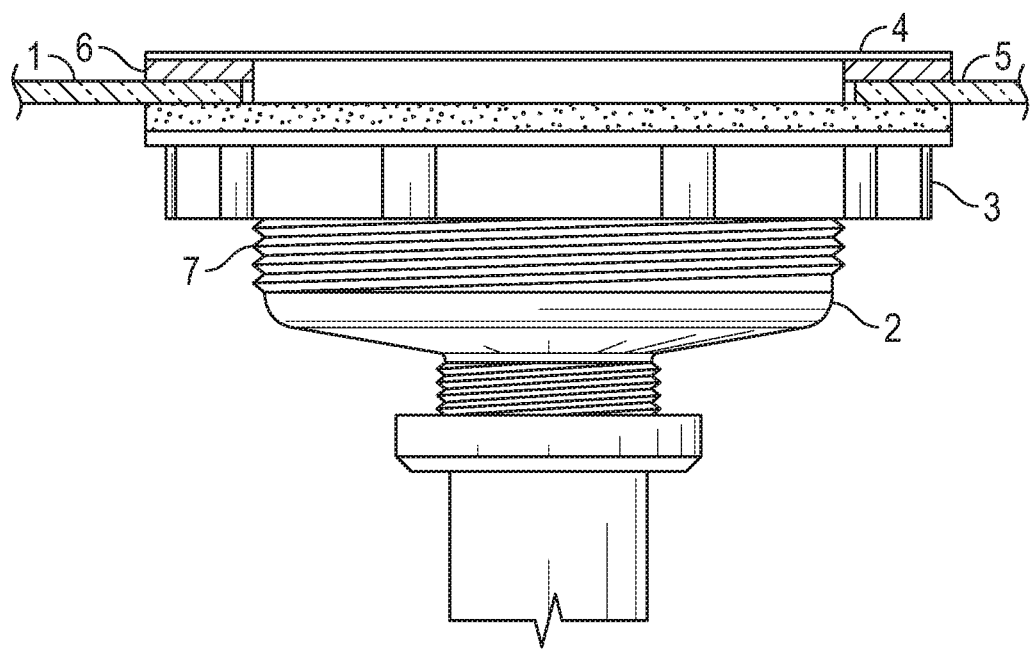
FIG. 2 is a partial cross-sectional, side elevational view of the prior art sink strainer and lock nut shown in FIG. 1.

Referring now to the drawings, FIGS. 1 and 2 illustrate a typical kitchen or other type of sink 1 with a sink strainer 2 being secured in a watertight position within the sink's drain hole with a coupling or lock nut 3 of the prior art. Sink strainers typically have an upper flanged edge 4 that seats against the sink interior (i.e., upper, surface 5) with a gasket 6 therebetween for insuring a watertight seal. The sink strainer 2 has a threaded outer surface 7 which, when installed, extends below the sink for engaging a threaded inner surface of the lock nut 3 as shown.

Coupling or lock nuts of the type described herein for plumbing applications are typically formed from a suitable metal or thermoplastic polymer which exhibits satisfactory strength to weight characteristics. Processing methods can include injection molding, extrusion molding, stretch-blow molding, thermoforming, and compression molding. Among thermoplastics suitable for this application are acrylonitrile butadiene styrene (ABS), nylon 6, nylon 6-6, polyamides (PA), polybutylene terephthalate (PBT), and polycarbonates (PC), although any other thermoplastic having the desired strength to weight characteristics may also be used.

Figure 3:
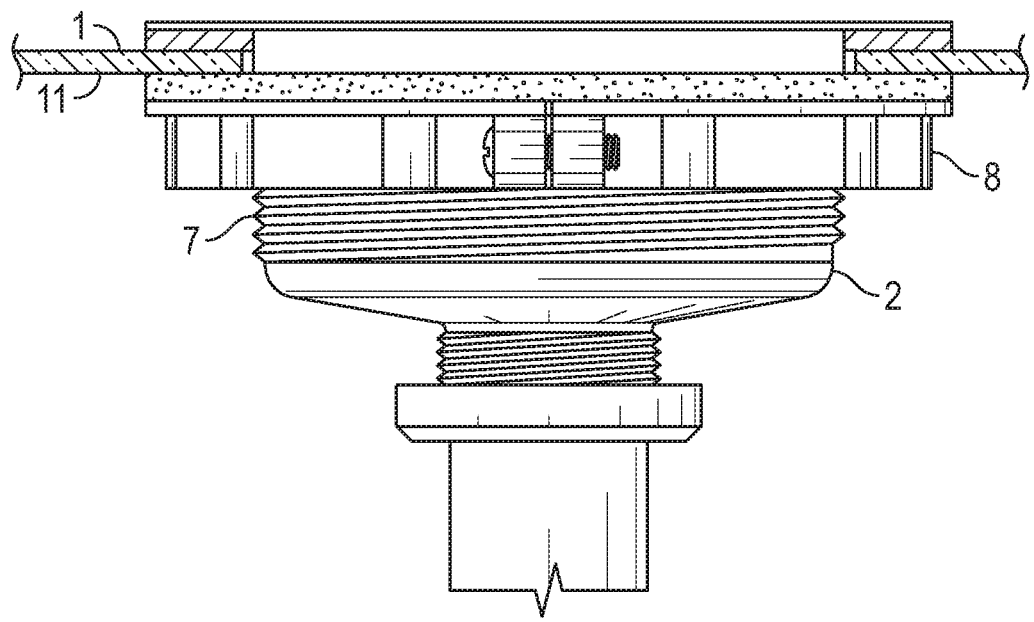
FIG. 3 is a partial cross-sectional, side elevational view of a sink strainer and split lock nut according to the described inventive concept(s).
Figure 4:
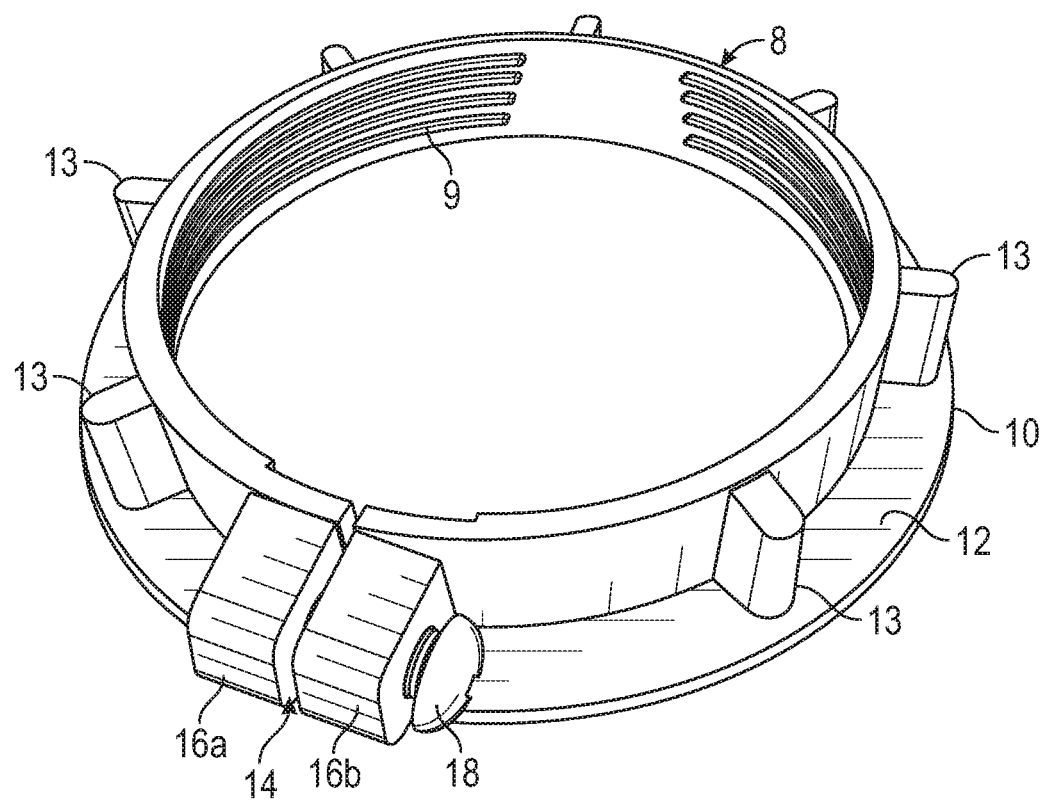
FIG. 4 is a perspective view of an underside of the split lock nut.

Referring now to FIG. 3, the basket strainer 2 is shown being secured with a split lock nut 8 constructed in accordance with the inventive concepts disclosed herein. As shown in FIG. 4, the split lock nut 8 has internal threads 9 for engaging the outer threaded surface 7 of the basket strainer 2. The split lock nut 8 has a conventional nut shape defined by an upper edge 10 for seating against the underside surface 11 of a sink. According to one embodiment, the upper edge 10 terminates in a flange 12 that forms a watertight seal when the split locking nut 8 is threaded into a locked position onto the outer surface 7 of the strainer 2.

The split lock nut 8 has a plurality of gripping nodules, or lugs, 13 spaced about the periphery of an outer surface of the lock nut 8. The number of lugs 13, their spacing about the periphery of the nut's outer surface, and their shape is not critical to the functionality of the split nut design or the described and claimed method of use.

Figure 5:
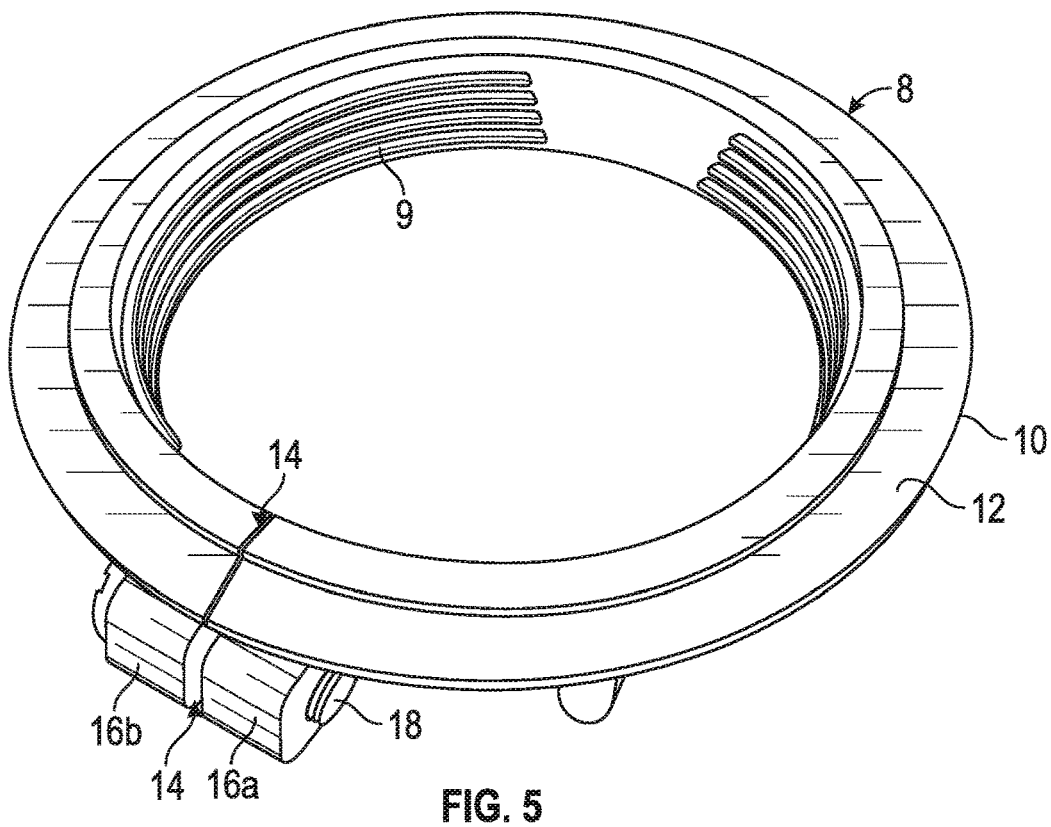
FIG. 5 is a perspective view of an upper side of a split lock nut.
Figure 6:
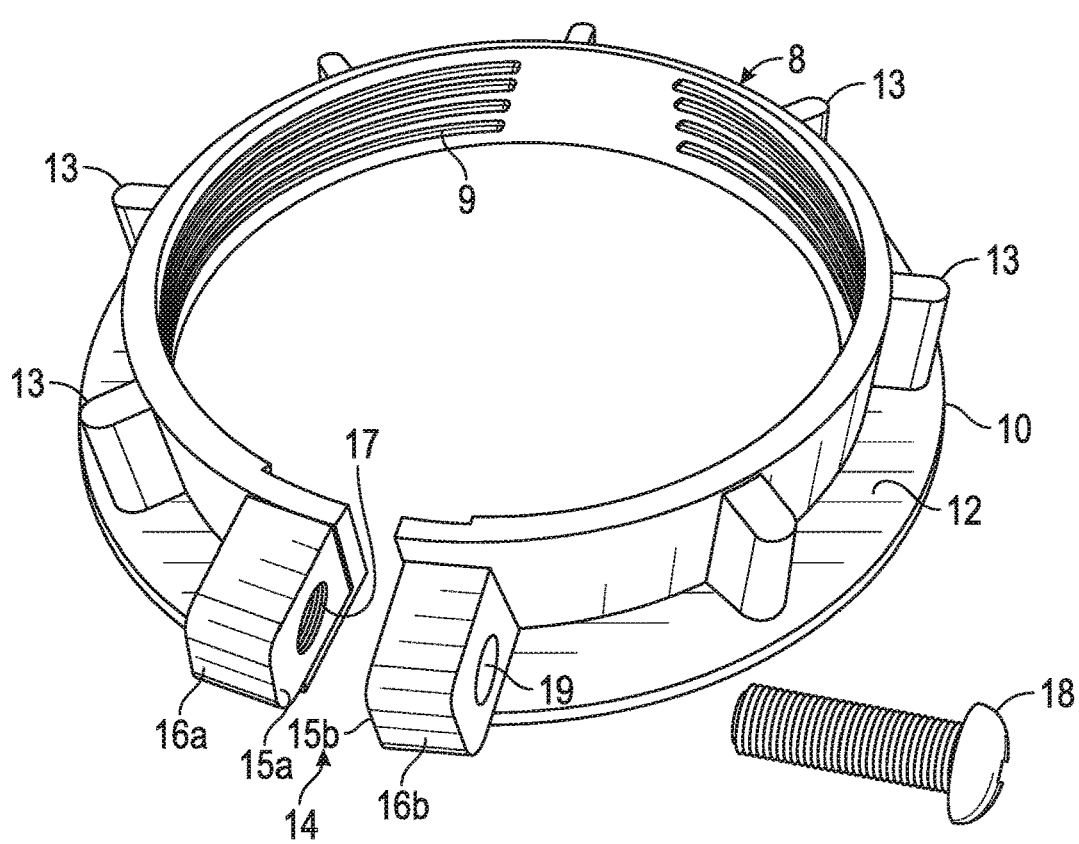
FIG. 6 is an exploded, perspective view of the split lock nut.

The split lock nut 8 has a split 14, corresponding generally to the rotational centerline of the lock nut 8, is defined by a pair of opposed surfaces 15*a* and 15*b*. The lock nut 8 has a locking system, comprising a pair of opposed tabs, 16*a* and 16*b*, for locking the opposed surfaces 15*a* and 15*b* in mating relationship during normal use, as shown in FIGS. 4 and 5. The first tab 16*a* is attached to the outer surface of the lock nut 8 on one side of the split 14, as shown in FIG. 6 with a threaded hole 17, spaced perpendicularly with respect to the opposed surfaces 15*a* and 15*b*, for receiving the threaded fastener 18. The second tab 16*b* is attached to the outer surface of the lock nut 8 on the opposite side of the split 14 in opposed spaced relationship to first tab 16*a*. The second tab 16*b* has a hole 19 in axisymmetric spaced relationship to the threaded hole 17 with a diameter of sufficient size to allow the threaded fastener 18 to pass therethrough.

The threaded fastener 18 is positioned within axisymmetric spaced hole 19 and arranged to pass therethrough and securely engage the threaded hole 17 in the first tab 16*a* as shown in FIG. 4. When turned in a clockwise direction and tightened, the threaded fastener 18 holds the opposed surfaces 15*a* and 15*b* in mating relationship during normal use of the split lock nut 8. When the threaded fastener 18 is turned in a counterclockwise direction and removed, the split lock nut 8 can be released from a bonded position on the underside of the sink by application of an external prying force between the opposed surfaces 15*a* and 15*b*, such as can occur with a screwdriver. An external force applied at any location about the periphery of the split nut will cause the nut to release, and it can be easily removed.

From the above description, it is clear that the inventive concepts disclosed herein is well adapted to carry out the objects and to attain the advantages mentioned and those inherent in the inventive concepts disclosed herein. While exemplary embodiments of the inventive concepts disclosed have been described for this disclosure, it will be understood that numerous changes may be made which will readily suggest themselves to those skilled in the art and which are accomplished within the scope and coverage of the inventive concepts disclosed and claimed herein.

What is claimed is:

1. A method for releasably securing a sink strainer in a drain hole of a sink by providing a lock nut of the type having a threaded internal surface for engaging a threaded outer surface of the sink strainer below the drain hole and to hold the sink strainer in a watertight position in the drain hole, while over time bonding to the underside surface of the sink, the lock nut defined by:
   (i) an upper edge for seating against the underside surface of the sink when the lock nut is threaded onto the outer surface of the sink strainer;
   (ii) an outer surface having a plurality of gripping nodules spaced about the periphery thereof;
   (iii) a split corresponding generally to a rotational centerline of the lock nut and being defined by a pair of opposed surfaces; and
   (iv) a locking system for locking the opposed surfaces in mating relationship during normal use, the locking system comprising a pair of opposed tabs, the first tab being attached to the outer surface of the lock nut on one side of the split and having a threaded hole spaced perpendicularly with respect to the opposed surfaces, for receiving a threaded fastener, the second tab being attached to the outer surface of the lock nut on the opposite side of the split in opposed spaced relationship to the first tab, the second tab having a hole in axisymmetric spaced relationship to the threaded hole with a diameter of sufficient size to allow the threaded fastener to pass therethrough, and a threaded fastener positioned within the axisymmetric spaced hole and arranged to pass through the hole in the second tab and securely engage the threaded hole in the first tab to hold the opposed surfaces in mating relationship during normal use, and when removed provide for the lock nut to release from its bonded position in response to application of an external force.

2. The method of claim 1, wherein the upper edge of the lock nut terminates in a flange for seating against the underside surface of the sink.

3. The method of claim 1, wherein the lock nut is molded from a thermoplastic polymer.

4. The method of claim 3, wherein the pair of opposed tabs are integrally molded with the lock nut.

* * * * *